July 4, 1944.   G. M. DARBY   2,352,772
TREATMENT OF IMPURE LIQUID
Filed May 18, 1937   3 Sheets-Sheet 2

INVENTOR
GEORGE M. DARBY,
BY Arthur Middleton
ATTORNEY.

July 4, 1944.   G. M. DARBY   2,352,772
TREATMENT OF IMPURE LIQUID
Filed May 18, 1937   3 Sheets-Sheet 3

INVENTOR.
GEORGE M. DARBY,
BY
ATTORNEY.

Patented July 4, 1944

2,352,772

UNITED STATES PATENT OFFICE 2,352,772

TREATMENT OF IMPURE LIQUIDS

George M. Darby, Westport, Conn., assignor to The Dorr Company, Inc., New York, N. Y., a corporation of Delaware Application May 18, 1937, Serial No. 143,259

4 Claims. (Cl. 210—16)

This invention relates to improved methods of and apparatus for the treatment of turbid liquids, such as water and sewage, by the separation therefrom of settled solids by flocculation and sedimentation.

The present method is especially applicable to the treatment of turbid liquids by coagmentation and flocculation to assist in sedimentation. In apparatus employed to clarify turbid liquids, particularly in water purification systems, very large tanks have heretofore been employed to carry out successfully the purification and clarifying process, especially if the amount of water to be purified and/or clarified was large. To avoid the necessity for large tanks there is employed, in practicing the present improved method of purification, clarifiers of the tray type having the various trays arranged in superposed relation and with the lowermost tray unit being a flocculation zone.

In practicing the present improved method of water clarification, it has been found desirable to introduce the feed into a bottom or lower section or compartment or zone wherein the water is subjected to gentle agitative effects capable of producing coagmentation and amassment of suspended solids in the water into flocs. This zone or compartment is a flocculation zone.

From this zone there rises or migrates flocculated liquid or liquid having mobile flocs therein, upwardly past pocketing means superposed with relation to the flocculation zone. The pocket means or apertured diaphragm as it may be, forms with the wall of the tank that houses the zone of complete treatment, an upper section or zone of quiescence wherein sedimentation can function.

Flocs in migrating upwardly past the pocket means into the sedimentation zone, continue to grow and to be conditioned for settleability until they reverse their direction and begin to deposit upon the floor of the pocket means or diaphragm in the form of sediment or sludge. Movable rakes or blades are provided to operate over this floor with the result that they squeeze and condense the sludge as well as working it in a direction whereby it, or at least some of it, cascades from the pocket means downwardly into the flocculation zone. The return to the flocculation zone of previously settled flocs is important to good flocculation, and it is to be noted that the return takes place in a manner whereby the fragile flocs are not harmed. Excess accumulations of sediment are removed from the pocket means as required.

Figure 1:
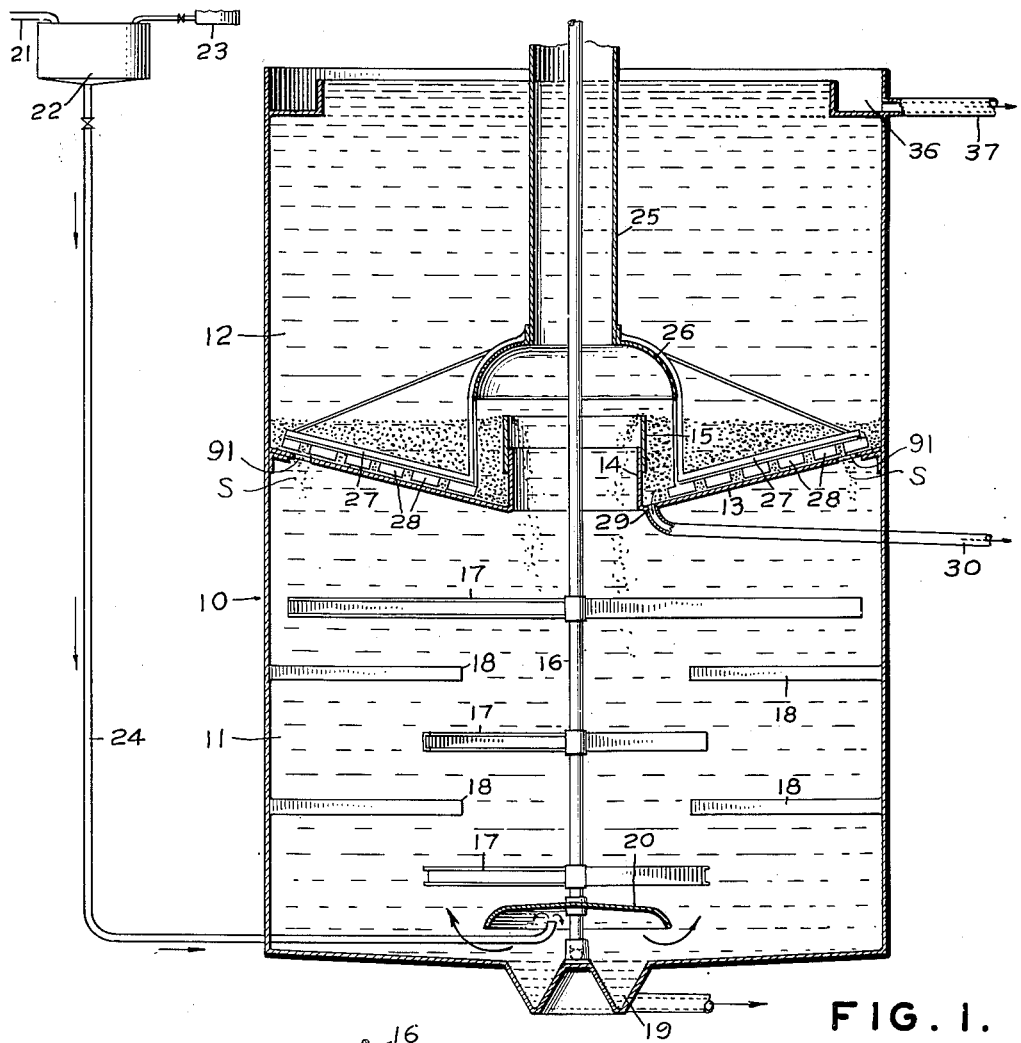
Fig. 1 is a vertical central section through one form of apparatus adapted for practicing the improved method of the present invention.
Figure 2:
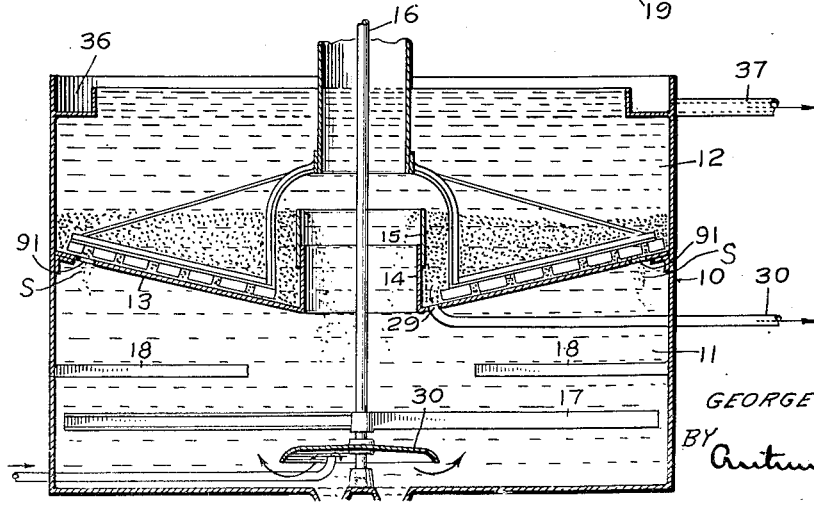
Fig. 2 is a vertical central section through a form of apparatus similar to the form shown in Fig. 1, but of less height.

Referring to the drawings, and particularly to Figs. 1 and 2, 10 designates a tank divided into compartments 11 and 12 by the tray, septum, or diaphragm 13. The tray 13 is sloped downwardly toward the center. At the center of the tray or diaphragm 13 is an upstanding boot or neck 14 provided with an adjustable collar 15, and by means of which the effective height of the boot or neck 14 may be varied. The boot or neck 14 provides a connecting passageway or throat between the compartments 11 and 12. A plurality of orifices or apertures 91 are provided in the upper outlying portions of the trays 13, to wit, in the regions within but proximate the marginal walls of the tank. These apertures are indicated respectively in Figs. 1 and 2 of the drawings and provide hydraulic communication between the chambers on both sides of the tray or diaphragm through which suspended solids S can pass.

The compartment 11 is the flocculating or floc conditioning compartment and has mounted therein a vertical shaft 16 carrying paddles 17 for agitating the fluid within the compartment. Cooperating with the paddles 17 are the stationary baffles 18, secured to the inner sides of the tank 10 and extending inwardly toward the center of the compartment. At the bottom of the compartment 11 is arranged an outlet 19 through which sediment or sludge may be withdrawn from the compartment as occasion requires.

The shaft 16 has mounted thereon, adjacent to the bottom of the compartment 11, an inverted cup-shaped member 20 acting as a deflector to prevent the establishment of currents or eddies in the liquid introduced into the compartment.

Water or other liquid to be treated is fed from a pipe 21 into a tank 22 where if needed it is dosed, either continually or intermittently, with a coagulating agent, such as alum, contained in a tank 23. The water to be treated passes from the tank 22 through the pipe 24 and into the compartment 11, the exit end of the pipe 24 being located under the inverted cup-shaped member 20.

The compartment 12 is the clarifying compartment or sedimentation tank. Rotatably mounted in the compartment 12, concentric with the shaft 16, is a quill shaft 25 having secured to its lower end a cage 26 carrying radial arms 27. The radial arms 27 carry sludge impelling or plowing rakes or blades 28 which engage with the diaphragm or tray 13 and rake sludge and sediment to a discharge opening 29. Connected to the discharge opening 29 is a discharge pipe 30 leading to any desired point.

At the upper end of the clarifying compartment or sedimentation tank 12 is a peripheral overflow weir forming a launder 36 with which is connected a discharge pipe 37 and through which is led the clarified effluent.

In Fig. 2 is shown an apparatus having similar characteristics to the apparatus shown in Fig. 1. In Fig. 2 however, the tank 10, and therefore the compartments 11 and 12, are of less depth than the corresponding parts in Fig. 1. This form of apparatus is adapted for use under conditions where depth is not desirable or space therefor is not available.

In the apparatus shown in Figs. 1 and 2, the turbid liquid to be treated is drawn from pipe 21 into the tank 22, where there is added a suitable coagulant, such as alum, from the tank 23. The chemically dosed water passes through pipe 24 and is discharged at the bottom of the flocculating compartment 11, the inverted cup-shaped member 20 deflecting the water, as indicated by the arrows, thus preventing the formation of currents in the water.

As the water flows into the flocculating compartment 11, it rises and is agitated gently by the paddles 17 on the rotating shaft 16, the agitating action being assisted by the presence of the stationary baffles 18. The rotation of the paddles 17 causes the water with its coagulated precipitates and floc nuclei to become coagmented and flocculated, whereupon the water, with its settleable flocs, is displaced or drifts or migrates upwardly by the new feed, through and over the top of the boot 14, and adjustable collar 15, into the clarifying compartment or sedimentation tank 12. The diaphragm 13 and its equivalents hereinafter described provide a sediment receiving surface. The diaphragm may be viewed as an element of, or as constituting, a partial partitioning means by which the interior of the tank is functionally divided into upper and lower sections of which the upper serves as a relatively quiescent clarifying compartment or zone and the lower serves as an agitated flocculation compartment or zone. Said sections or zones are in constant hydraulic communication with each other through upflow area left because of the partitioning means having extent only part way across the tank. In the construction shown the upflow area or passageway is provided through a central aperture of the diaphragm and the upstanding boot or upcast neck 14, which is tubular so that the diaphragm is annulate in type. The diaphragm or apertured member and the upcast tubular boot 14 collectively constitute and provide that which may be referred to as a pocketing means or pocket disposed within the tank and sufficiently spaced from the agitating means within the flocculating section or compartment to permit the reception, deposition and collection as sediment therein of flocs migrating upwardly above and settling towards the same. From this pocket means sedimented flocs are adapted to cascade downwardly into the flocculation zone.

As the tray 13 shuts off from the clarifying compartment or sedimentation tank 12, agitation in the flocculating compartment 11 that would be harmful to sedimentation there is undisturbed quiescence in the latter which permits sedimentation to take place unmolestedly, so that settled or deposited sludge fills up the tray 13 to the top of the boot 14 and collar 15. This sludge blanket maintained on the tray 13 and plowed by the sludge blades 28 is thus squeezed and thickened or condensed, so that the sludge that is drawn off through the sludge discharge outlet 29 via the pipe 30 is in thickened condition.

Sludge accumulating or depositing on the tray 13 tends to spill or cascade over the lip of the collar 15 down into the flocculating compartment 11. There is thus maintained a fairly high concentration in the flocculating compartment 11 of sludge which has been settled or sedimented. This is a highly desirable condition and is efficient in that it agglomerates and coagments or conditions all of the particles of turbidity in the liquid being treated into settleable flocs both as regards size and density. The flocs are thus formed in the presence of a high concentration of already formed flocs, and then the settleable flocs are drifted or migrate hydraulically from the flocculation compartment 11 upwardly into the clarifying compartment or sedimentation tank 12, under conditions of quiescence, whereby the flocs are not disintegrated. The chemical from the tank 23 when mixed with the liquid from the pipe 21 coagulates the solids or particles of turbidity in the liquid into pin flocs or floc nuclei and these nuclei are built up or conditioned by being coagmented and rolled up into settleable condition by the gentle agitative effect encountered in the flocculation zone 11.

The sludge discharged from clarifying compartment or sedimentation tank 12 through the pipe 30 is in highly thickened form. The water, rising in the tank 12 becomes less and less turbid, and as the level of the water approaches the overflow launder 36 it becomes clear, and the clear effluent flows from the launder into and through the outflow pipe 37.

The operation of the apparatus shown in Fig. 2 is identical with that of the apparatus shown in Fig. 1 and therefore, need not be described in detail.

Figure 3:
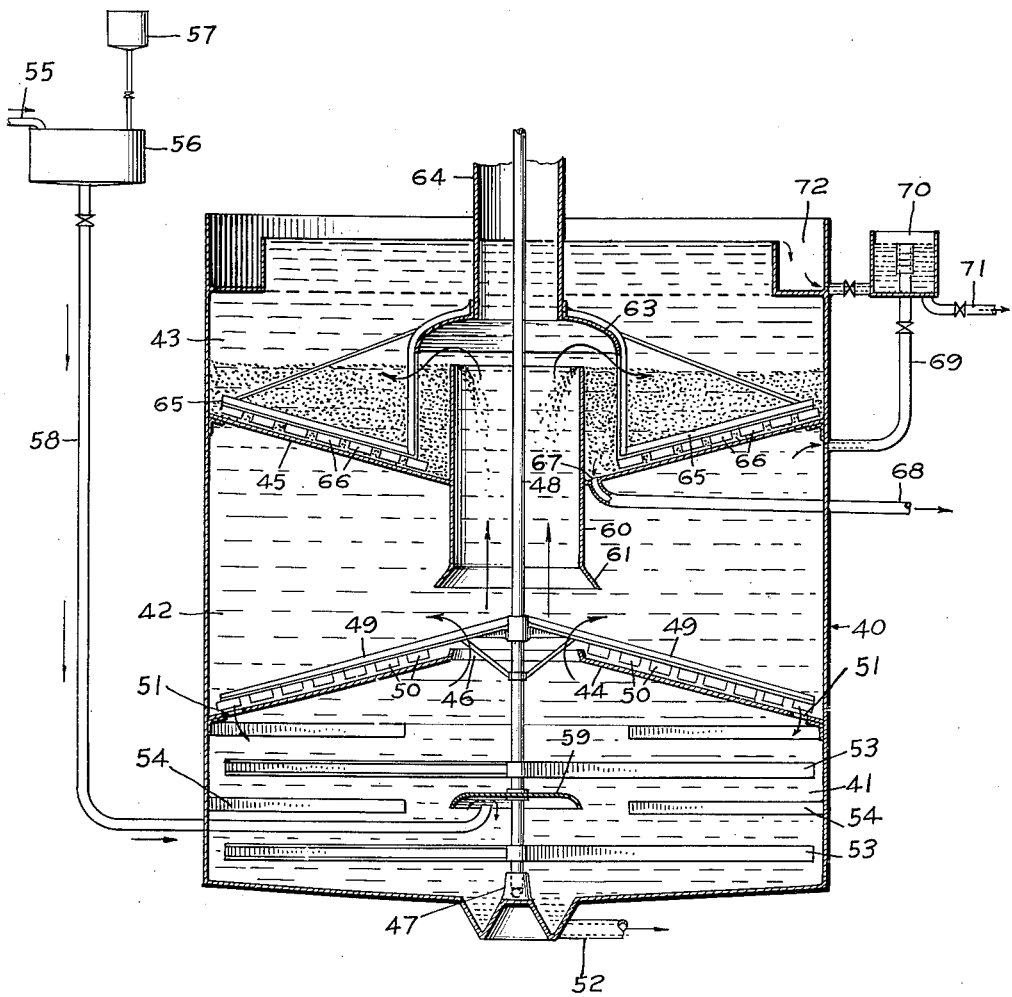
Fig. 3 is a vertical central section through a modified form of apparatus, having a plurality of superposed clarifying or sedimentation chambers in combination with a flocculating chamber.

Referring now to Fig. 3, there is shown a modified form of the apparatus and in which the tank 40 is divided into a plurality of superposed compartments 41, 42 and 43 by the diaphragms or trays 44 and 45 respectively. The compartment 41 is the flocculating or floc conditioning compartment and the compartments 42 and 43 are the clarifying and sedimentation compartments wherein sludge thickening also takes place.

The diaphragm or tray 44, separating the flocculating compartment 41 from the sedimentation compartment 42, is cone-shaped and is provided with a central orifice 46 forming a connecting passage between the compartments 41 and 42. Extending through the orifice 46 and having its lower end working in a step bearing 47 is a shaft 48, to which is attached the radially extending arms 49. On the lower face of the arms 49 are mounted sludge impelling or raking members 50 which engage with the upper surface of the diaphragm 49 and rake or plow sludge and sediment deposited thereon outwardly from the orifice 46 and into position to pass through openings 51, as indicated by the arrows. The sludge or sediment thus passes downwardly into the flocculating compartment 41, where they mix with the water in such compartment. The sludge and sediment thus passed or cascaded into the flocculating compartment have a beneficial effect on the flocculating process being carried out therein, having the effect of accelerating the flocculating action. Excess of sludge and sediment accumulating in the compartment 41 is removed through an opening 52 at the lowermost point in the compartment.

Also attached to the shaft 48 and located in the flocculating compartment 41 are flocculating paddles 53 which cooperate with stationary baffles 54 in agitating the water in inducing coagmenting flocculation or floc conditioning.

The water to be purified and clarified is fed through pipe 55 into tank 56, where it is dosed with a chemical coagulant, such as alum, from the tank 57. The water is then led through pipe 58 and is discharged into the compartment 41 near the bottom thereof. The discharge end of the pipe 58 is placed beneath an inverted cup-shaped member 59 secured to shaft 48, and the water to be treated is thus fed into the flocculating compartment 41 practically without motion.

As liquid is fed into the flocculation compartment 41 the level thereof rises, and during this time flocculation is taking place. That portion of the sediment in the water that has been sufficiently conditioned to be settleable drops to the bottom of the compartment against the upward flow of the water therein, while the lighter particles in suspension pass or migrate upwardly with the upflow of water through the orifice 46, as indicated by the arrows, and into the sedimentation compartment 42.

The sedimentation compartment 42 has its upper limit defined by the diaphragm 45, which is in the form of an inverted cone. At the center of the diaphragm 45 is arranged a cylindrical boot 60, the lower end of which is flared, as indicated by the reference character 61 and terminates adjacent to the orifice 46 in the diaphragm 44.

The construction is such therefore that a portion of the floc ladened water passes upwardly through the boot 60 and into the clarifying compartment 43. The upper end of the boot 60 terminates at a point beneath the hood 63 carried by the quill shaft 64, and thus the upwardly moving water flows into the compartment 43 in a substantially horizontal direction, as indicated by the arrows.

The quill shaft 64 also has mounted thereon radially extending arms 65 carrying raking blades 66 which rake deposited sludge and sediment to a discharge orifice 67 to which is connected a discharge pipe 68. As water rises in the compartment 42 the flocs in the water increase in size and mass and fall onto the diaphragm 44. The water is therefore clarified and the clarified effluent passes through the pipe 69 into the collecting tank 70 and thence into the distributing pipe 71. The water which flows into the compartment 43 through the boot 60 has the flocs therein increase in size and mass, and the now clarified water flows into the peripheral launder 72 and from thence into the collecting tank 70.

The use of a plurality of clarifying and sedimentation compartments or tanks in superposed relation, as the compartments 42 and 43, permits of a relatively slow upward movement of the column of water being treated, and thus accentuates the flocculation action and accelerates the sedimentation process. The return of the sludge or sediment, or a portion thereof, from the lowermost clarifying compartment into the flocculating compartment is beneficial as it maintains a supply of seed which assists in the more rapid development or growth of floc. The clarified effluent is drawn off from the top of each of the superposed clarifying compartments.

Figure 4:
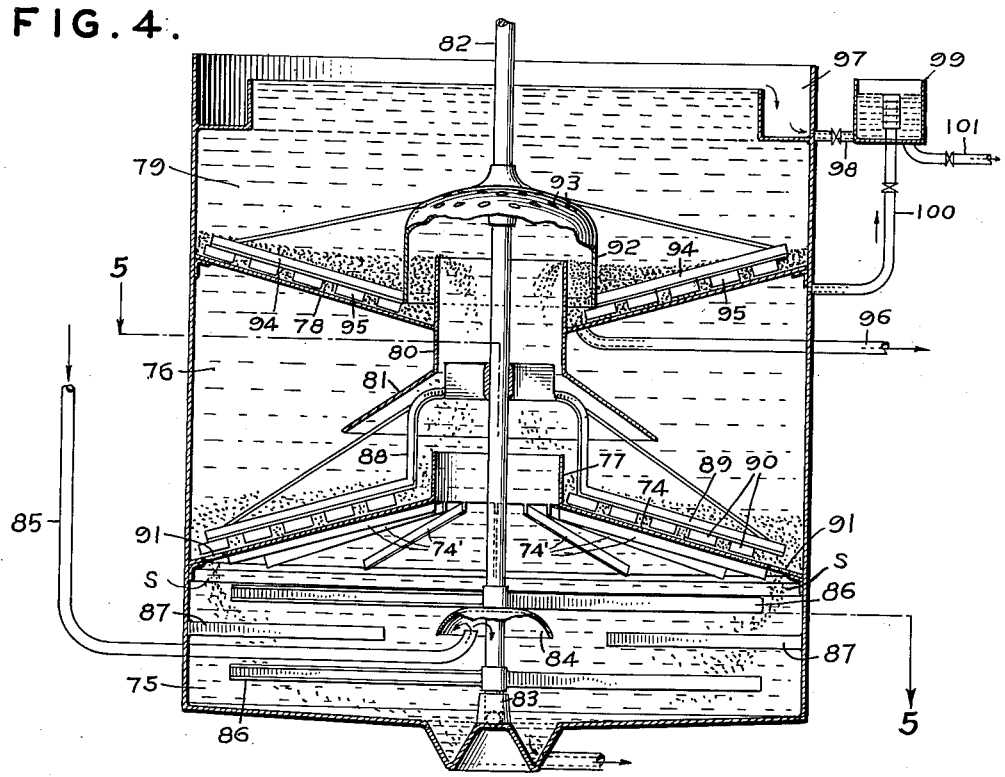
Fig. 4 is a vertical central section through a further modified form of apparatus, similar to the modification shown in Fig. 3, but in combination with some of the constructional features of the structure shown in Figs. 1 and 2.
Figure 5:
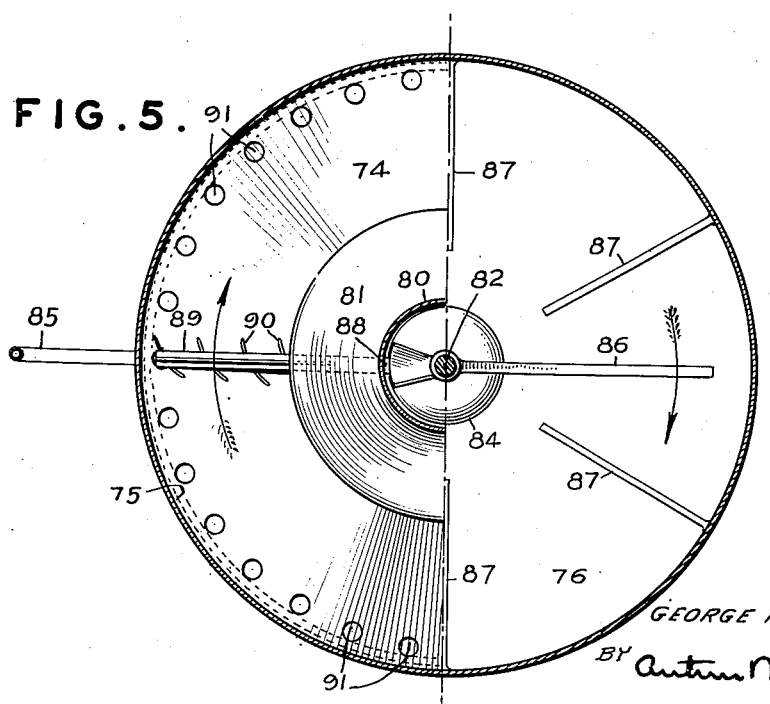
Fig. 5 is a sectional plan view taken on the line 5—5 of Fig. 4.

In Figs. 4 and 5 is illustrated a still further modification of the apparatus of the present invention wherein the diaphragm 74 separating the flocculating compartment 76 from the lowermost clarifying and sedimentation compartment 75 is provided with an upstanding boot 77, and the diaphragm 78 separating the compartment 76 from the uppermost clarifying and sedimentation compartment 79 is provided with a boot 80. The upper end of the boot 80 extends up into the compartment 79, and the lower end extends downwardly into the compartment 76. The lower end of the boot 80 is provided with an inverted funnel-shaped member 81 against which the column of water rising through the boot 77 engages. A portion of such rising water passes upwardly through the boot 80 into the compartment 79 and the remainder is deflected downwardly by the funnel-shaped member 81 into the compartment 76.

A vertical shaft 82 rotates in a step bearing on the bottom of the compartment 75 and extends upwardly through the boots 77 and 80 and is rotated in any suitable manner. Such shaft 82 has attached thereto, in that portion within the compartment 75, a deflecting bell-shaped member 84 within which is positioned the discharge end of the feed pipe 85. Also, there is attached to the shaft 82 the paddles 86 which cooperate with stationary paddles 87 attached to and exending inwardly from the wall of the compartment and which also cooperate with overlying radially disposed fixes fins 74' depending from the bottom of tray 74 and which function to still agitative disturbances set up by the blades.

On the shaft 82 within the compartment 76 is attached a spider 88, having radially extending arms 89. To the under face of the arms 89 are secured raking blades 90. The diaphragm 74 is cone-shaped and therefore the raking blades rake the sludge and sediment deposited on the upper surface of the diaphragm outwardly toward the discharge orifices 91 and through which the suspended solids S of the sludge and sediment fall into the compartment 75.

On the shaft 82 within the compartment 79 is attached a hood 92 which surrounds the boot 80. The upper end of the hood 92 is perforated as indicated by the reference numeral 93. Carried by the hood are radially extending arms 94. To the under face of the arms 94 are attached raking blades 95. The diaphragm 78 is in the form of an inverted cone and therefore the raking blades 95 rake the sludge and sediment deposited on the upper surface thereof inwardly toward the center of the compartment 79 to a discharge pipe 96.

At the upper end of the compartment 79 is arranged a peripheral launder 97 into which the clarified effluent flows from the compartment and is led through a pipe 98 into the collecting tank 99. This tank is also connected through pipe 100 with the upper end of the chamber 76 and clarified effluent from this chamber is also collected in the tank 99. A discharge pipe 101 provides means for drawing the clarified effluent from the collecting tank 99 and leading the same to any desired point. The under side of the tray 74 is provided with vanes 74', preferably radially extending into the bottom or flocculating compartment 75 for preventing swirl or eddies as the flocculated liquid rises or drifts upwardly into the settling compartment 76.

The operation of the apparatus shown in Figs. 4 and 5 is identical with the apparatus shown in Figs. 1, 2, and 3, except that the work of clarification and sedimentation of the rising water is more equally divided between the two chambers 76 and 79. The inverted cone-shaped member 81 at the lower end of the boot 80 diverts a relatively large portion of the water into the chamber 79, but any increase in the volume of flow of such water through the boot 80 does not result in increased turbulence of such water as it enters the chamber 79. Such possible increase in turbulence is prevented by the perforated hood 82 and therefore the water entering the chamber 79 is practically quiescent.

I claim:

1. Apparatus for purifying liquids comprising a tank, an inclined wall structure in said tank dividing said tank into an upper clarifying zone and a lower mixing zone and so constructed and arranged as to form a constantly open passageway communicating said upper and lower zones, means forming a pocket in said tank in communication with said clarifying zone above said passageway for receiving solids settling in said last mentioned zone, an outlet from the lower portion of said pocket, means for supplying liquid to be treated and a chemical reagent to the mixing zone, mechanical rotary means in the mixing zone for agitating liquid therein, and an outlet for removing purified liquid from the upper portion of the clarifying zone.

2. Apparatus for clarifying liquids including a floc concentration chamber, means for passing liquid through said chamber, mechanical means for agitating and mixing the liquid and for forming a blanket of floc particles within the chamber and means for withdrawing liquid from the chamber after it has passed through the blanket and for withdrawing flocs from the upstream portion of the blanket, means for settling the floc out of said liquid and for collecting the flocs thus settled.

3. Apparatus for clarifying liquids including a floc concentration chamber, means for passing liquid through said chamber, means independent of the rate of flow of liquid through the chamber for agitating and mixing the liquid and for forming a blanket of floc particles within the chamber, and means for withdrawing liquid from the chamber after it has passed through the blanket and for withdrawing flocs from the upstream portion of the blanket, means for settling the floc out of said liquid and for collecting the flocs thus settled.

4. An apparatus for clarifying liquids including a floc concentration chamber and a sedimentation chamber, means for passing liquid first through the floc concentration chamber and then through the sedimentation chamber, means in the path of the liquid in the floc chamber for agitating and mixing the liquid and for forming and maintaining a blanket of floc particles extending substantially entirely across the line of flow of the liquid through the floc chamber, the liquid after it has passed through the floc blanket being adapted to pass into the sedimentation chamber.

GEORGE M. DARBY.